Sept. 11, 1956   H. B. VAN RADEN   2,762,622
SPRING END SHACKLE
Filed Feb. 13, 1953
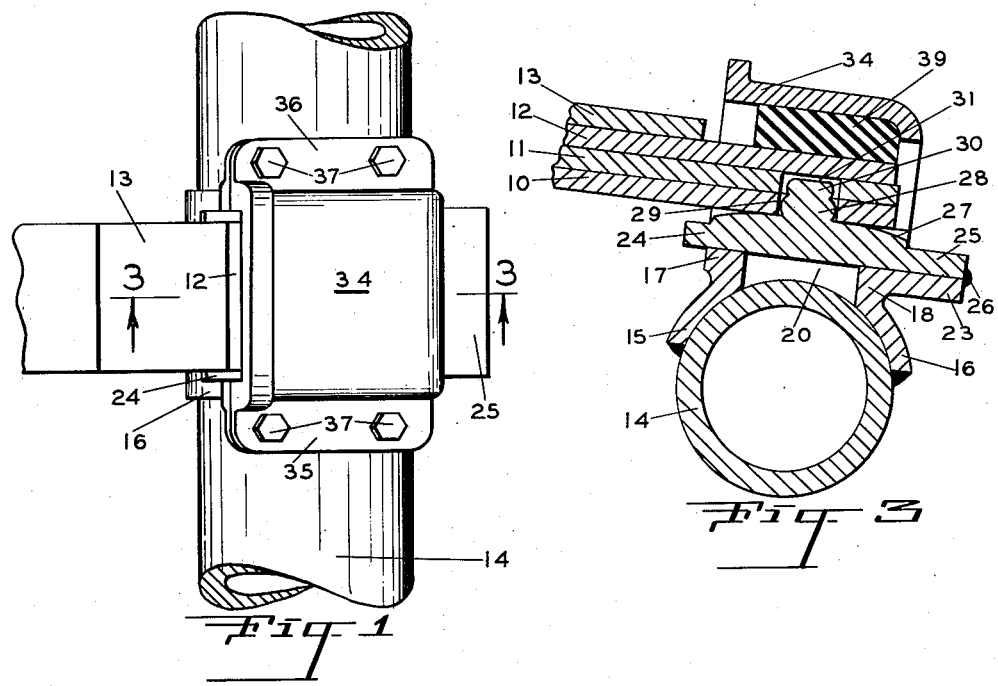
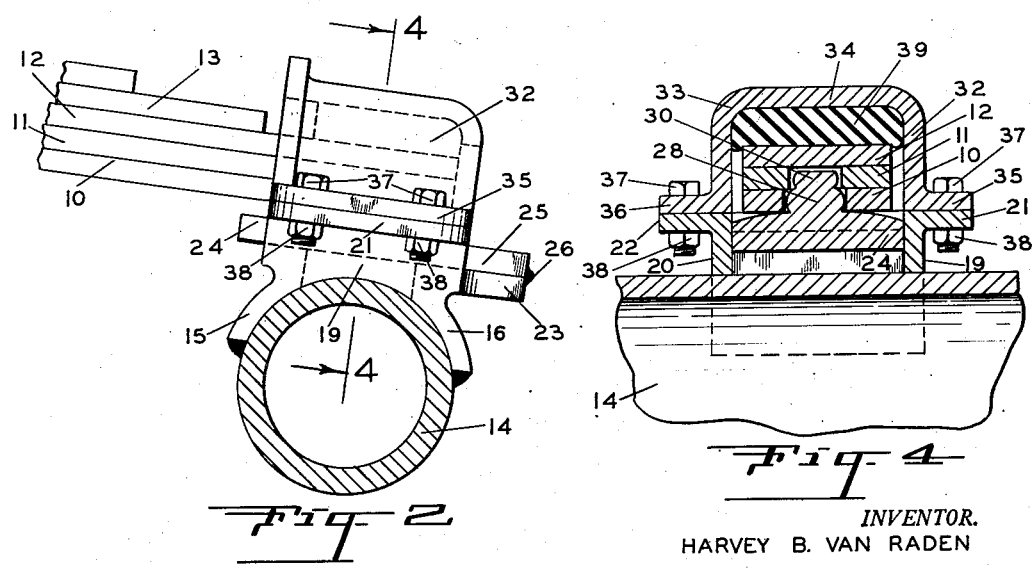
INVENTOR.
HARVEY B. VAN RADEN
BY
Buckhorn and Cheatham
ATTORNEY

2,762,622
SPRING END SHACKLE

Harvey B. Van Raden, Portland, Oreg., assignor to Ne Peer Company, Portland, Oreg., a copartnership Application February 13, 1953, Serial No. 336,780

7 Claims. (Cl. 267—54)

My present invention comprises an improved spring end shackle for attaching the end of a vehicle leaf spring to a transverse wheel mounting member, whereby the transverse wheel mounting member may cant transversely with respect to the longitudinal direction of the spring, the transverse wheel mounting member may be rocked angularly with respect to the end of the leaf spring, and the leaf spring may flex, without any of such actions, either alone or all occurring simultaneously, placing a strain upon the leaf spring or its connection to the wheel mounting member.

The principal object of the present invention is to achieve the result noted above in a sturdy construction of extreme simplicity and which is extremely safe in use.

A further object of the present invention is to provide a construction of the character described comprising two parts which may be welded together as a final assembly step in order accurately to fix the transverse wheel mounting member with respect to a vehicle, the nature of the two weld-attached members being such that the weld may be cut away to permit disassembly of the construction without destroying the two members whereby they may be again welded together when the vehicle is reassembled. By reason of the foregoing, major overhauls and replacement of worn or broken parts may be most economically achieved.

The objects and advantages of the present invention will be more readily ascertained from inspection of the accompanying drawings taken in connection with the following specification wherein like numerals refer to like parts throughout.

In the drawings,

Fig. 1 is a plan view of the end of a leaf spring connected to a portion of a transverse wheel mounting member by means of the present invention Fig. 2 is a side elevation of Fig. 1;

Fig. 3 is a vertical section taken substantially along line 4—4 of Fig. 1; and

Fig. 4 is a vertical section taken substantially along line 4—4 of Fig. 2.

It is preferred that a leaf spring employed in connection with the present invention comprises at least two, and preferably three, lower leaves of substantially the same length, these leaves being indicated at 10, 11 and 12. It will be appreciated that other leaves of progressively shorter length, such as the leaf 13, may comprise the complete spring. In accordance with the present invention the end of the leaf spring is secured to a transverse wheel mounting member such as the tubular member 14 disclosed in the drawing by way of example. As is well known in the vehicle art, such a wheel mounting member may support wheel spindles at the opposite ends thereof or may have a driven axle extending therethrough.

The spring end is secured to the transverse member by a base including portions 15 and 16 conforming to the upper surface of the member 14 and adapted to be welded thereto. The portions 15 and 16 extend upwardly beyond the top of the member 14 to provide a spaced pair of walls 17 and 18, the upper edges of which lie in a common horizontal plane substantially parallel to the lower surface of the lower spring leaf 10. The portions 15 and 16 are connected by longitudinal walls 19 and 20 which extend upwardly above the tops of the walls 17 and 18 and terminate in laterally extending flanges 21 and 22 respectively. The four walls therefore define an upwardly open, open-ended, rectangular trough, the lateral width of which is substantially greater than the width of the leaf spring, as seen most clearly in Fig. 4. The bottom of the trough is defined in part by a flange 23 extending longitudinally in the direction of the spring beyond the end of the spring.

A spring securing member 24 is secured in the trough as follows: The width of the member is substantially the same as the width of the trough whereby the longitudinal side edges thereof may snugly engage the inner surfaces of the walls 19 and 20. A portion 25 of the securing member overlies the flange 23, the ends of the flange 23 and the portion 25 being closely adjacent each other and being secured together by welding as indicated at 26. By reason of this construction the final step in assembly may be the rigid securing together by welding of the base and the spring end securing member, subsequent to accurate location of the wheel mounting member 14 with respect to the vehicle. If it should be necessary to disassemble the construction a torch may be used to cut away the welding at 26, and the parts may be rewelded together a number of times without replacement of the base 15 or the securing member 24.

The spring end securing member comprises a convex surface portion 27 upon which the end of the lower spring leaf 10 rests. The spring end securing member comprises a ball pin 28 which projects upwardly centrally of the convex surface 27 and snugly fits an opening 29 in the leaf 10. By reason of this construction the spring end may rock longitudinally and transversely with respect to the base without straining the leaves of the spring. The ball pin is preferably provided with a ball pin extension 30 which projects upwardly into a second opening 31 in the next adjacent spring leaf 11, this opening being of somewhat larger size than the extension, particularly in the longitudinal direction of the spring. The reason for the extension is that the portion 28 is of substantial diameter for strength, and the spring leaf 10 is thereby considerably weakened. The smaller extension 31 may therefore act as a safety device in the event that the leaf spring 10 should break adjacent the opening 29. It is less likely that the spring leaf 11 would break since the opening therethrough is of lesser width. The height of the portion 28 is substantially the same as the vertical thickness of the leaf 10 while the height of the extension 30 is less than the thickness of the leaf 11 in order to permit free play of the parts with respect to each other. The third spring leaf 12 of substantially the same length is provided in order to cap the opening 31 into which the ball pin extension protrudes.

In order to hold the assembly together a housing comprising side walls 32 and 33 and a top 34 is provided, the side walls being spaced the same as the spacing of the side walls 19 and 20 in order that the separable housing will complement the base to provide an open ended enclosure for the end of the leaf spring. The side walls 32 and 33 are provided with horizontal flanges 35 and 36, respectively, matching the flanges 21 and 22, respectively. The flanges are provided with aligned openings for reception of threaded fastening means comprising a plurality of bolts 37 and nuts 38, the bolts passing freely through aligned openings in the flanges and extending vertically with respect to the longitudinal direction of the spring. A substantially rectangular pad 39 of rubberous material is compressed between the upper surface of the end of the leaf spring 12 and the lower surface of top 34. The pad is preferably of substantially the same width as the interior of the housing and is normally of slightly greater depth than the depth of the space in which it is confined when the nuts 38 are tightened to their fullest extent. The leaf spring is thereby resiliently but firmly held onto the spherical surface 27.

Having illustrated and described a preferred embodiment of my invention, it should be apparent to those skilled in the art that the same permits of modification in detail and arrangement. All such modifications as come within the true spirit and scope of the appended claims are considered to be a part of my invention.

I claim:

1. The combination with a vehicle leaf spring of an improved spring end shackle for attaching the end of the vehicle leaf spring to a transverse wheel mounting member comprising a base adapted to be fixed to a wheel mounting member, and a spring securing member seated on said base and secured thereto, said spring securing member having a convex upper surface upon which the end of the spring rests and comprising an upwardly projecting ball pin disposed centrally of said surface, there being a central opening in the end of the spring snugly receiving said ball pin.

2. The combination with a vehicle leaf spring of an improved spring end shackle for attaching the end of the vehicle leaf spring to a transverse wheel mounting member comprising a base adapted to be fixed to a wheel mounting member, said base comprising means defining an upwardly open trough extending in the longitudinal direction of the spring, and a spring securing member seated snugly in said trough, said spring securing member having a convex upper surface upon which the end of the spring rests and comprising an upwardly projecting ball pin disposed centrally of said surface, there being a central opening in the end of the spring snugly receiving said ball pin, and means securing said member against longitudinal movement with respect to said base.

3. The combination with a vehicle leaf spring of an improved spring end shackle for attaching the end of the vehicle leaf spring to a transverse wheel mounting member comprising a base adapted to be fixed to a wheel mounting member, said base comprising means defining an upwardly open trough extending in the longitudinal direction of the spring, a spring securing member seated in said trough, said spring securing member having a convex upper surface upon which the end of the spring rests and comprising an upwardly projecting ball pin disposed centrally of said surface, there being a central opening in the end of the spring snugly receiving said ball pin, a housing member comprising a pair of side walls and a top, threaded means detachably securing said housing member to said base in complementary relation thereto to define an open end enclosure of greater width and depth than the spring end and into which the spring end projects, a pad of rubberous material disposed in the space between the upper surface of the spring end and said top, said threaded means extending vertically with respect to the spring end and said pad being of greater depth than the space in which it is confined whereby the pad is compressed when the threaded means is tightened, and means securing said member against movement with respect to said base.

4. The combination with a vehicle leaf spring of an improved spring end shackle for attaching the end of the vehicle leaf spring to a transverse wheel mounting member comprising a base adapted to be fixed to a wheel mounting member, said base comprising means defining an upwardly open trough extending in the longitudinal direction of the spring, a spring securing member seated in said trough, said spring securing member having a convex upper surface upon which the end of the spring rests and comprising an upwardly projecting ball pin disposed centrally of said surface, there being a central opening in the end of the spring snugly receiving said ball pin, a housing member comprising a pair of side walls and a top, threaded means detachably securing said housing member to said base in complementary relation thereto to define an open end enclosure of greater width and depth than the spring end and into which the spring end projects, a pad of rubberous material disposed in the space between the upper surface of the spring end and said top, said threaded means extending vertically with respect to the spring end and said pad being of greater depth than the space in which it is confined whereby the pad is compressed when the threaded means is tightened, said base comprising a flange extending longitudinally in the direction of the spring and defining in part the bottom of said trough and said spring securing member comprising a portion overlying said flange, and welding joining the ends of said flange and said portion together rigidly to secure said spring securing member against movement with respect to said base.

5. The combination with a vehicle leaf spring composed of a plurality of superimposed spring leaves of substantially equal length of a spring end shackle construction for attaching the end of the vehicle leaf spring to a wheel mounting member whereby said wheel mounting member may rock transversely and longitudinally with respect to the spring without straining the spring, comprising a base adapted to be rigidly secured to the wheel mounting member, said base defining a rectangular trough open at its ends and top, a platelike spring securing member seated in said trough, said spring securing member having longitudinal side edges snugly engaging the sides of said trough, said spring securing member having a convex upper surface symmetrically disposed in said trough and upon which the spring end rests and comprising a centrally disposed ball pin projecting upwardly from said surface, there being a central opening in the lowermost leaf of said spring snugly receiving said ball pin, a housing member comprising a pair of side walls and a top, threaded means detachably securing said housing member to said base in complementary relation thereto to define an open end enclosure of greater width and depth than the spring end and into which the spring end projects, a pad of rubberous material disposed in the space between the upper surface of the spring end and the top of said housing member, said threaded means extending vertically with respect to the spring end and said pad being of greater depth than the space in which it is disposed whereby the pad is compressed when the threaded means is tightened, said base comprising a flange defining in part the bottom of said trough and extending longitudinally beyond the end of said spring, said spring securing member comprising a portion overlying said flange, and welding securing the ends of said flange and said portion together to secure said spring securing member against longitudinal movement relative to said base.

6. The combination with a vehicle leaf spring composed of a plurality of superimposed spring leaves of substantially equal length of a spring end shackle construction for attaching the end of the vehicle leaf spring to a wheel mounting member whereby said wheel mounting member may rock transversely and longitudinally with respect to the spring without straining the spring, comprising a base adapted to be rigidly secured to the wheel mounting member, said base defining a rectangular trough open at its ends and top, a platelike spring securing member seated in said trough, said spring securing member having longitudinal side edges snugly engaging the sides of said trough, said spring securing member having a convex upper surface symmetrically disposed in said trough and upon which the spring end rests and comprising a centrally disposed ball pin projecting upwardly from said surface, there being a central opening in each of the lowermost and next adjacent leaves of said spring, a housing member comprising a pair of side walls and a top, threaded means detachably securing said housing member to said base in complementary relation thereto to define an open end enclosure of greater width and depth than the spring end and into which the spring end projects, a pad of rubberous material disposed in the space between the upper surface of the spring end and the top of said housing member, said threaded means extending vertically with respect to the spring end and said pad being of greater depth than the space in which it is disposed whereby the pad is compressed when the threaded means is tightened, said base comprising a flange defining in part the bottom of said trough and extending longitudinally beyond the end of said spring, said spring securing member comprising a portion overlying said flange, and welding securing the ends of said flange and said portion together to secure said spring securing member against longitudinal movement relative to said base, said ball pin snugly fitting said opening in the lowermost spring leaf and having a spherically surfaced extension extending into said opening in the spring leaf adjacent to the lowermost one, and said opening in said adjacent spring leaf being elongated at either side of said extension in the direction of elongation of the spring.

7. The combination with a vehicle leaf spring of an improved spring end shackle for attaching an end of the vehicle leaf spring to a transverse wheel mounting member comprising a base adapted to be fixed to a wheel mounting member, said base comprising means defining an upwardly open trough having parallel side walls extending in the longitudinal direction of the spring, and a spring securing member seated snugly in said trough, said spring securing member having parallel sides engaging said side walls and a convex upper surface upon which the end of the spring rests and comprising an upwardly projecting ball pin disposed centrally of said surface, there being a central opening in the end of the spring snugly receiving said ball pin, and means securing said spring securing member against longitudinal movement with respect to said base comprising a longitudinally extending flange on said base and having its upper surface flush with the bottom of said trough, said flange extending beyond the end of the spring, a second flange on said spring securing member overlying said first flange and having its end edge adjacent the end edge of said first flange, and welding securing said end edges together.

References Cited in the file of this patent

UNITED STATES PATENTS

| 1,623,844 | Kogstrom | Apr. 5, 1927 |
| 1,738,747 | Alden et al. | Feb. 25, 1930 |
| 2,539,091 | Linke | Jan. 23, 1951 |
| 2,562,256 | Benz | July 31, 1951 |

FOREIGN PATENTS

| 616,921 | Germany | Aug. 7, 1935 |